United States Patent

Jacura

[11] 3,881,271
[45] May 6, 1975

[54] FISHING LURE

[75] Inventor: Sylvester Jacura, Victoria, British Columbia, Canada

[73] Assignee: Gibbs Tool and Stamping Works Ltd., Burnaby, British Columbia, Canada

[22] Filed: Apr. 8, 1974

[21] Appl. No.: 458,513

[52] U.S. Cl. .................................... 43/42.5
[51] Int. Cl. ............................... A01k 85/04
[58] Field of Search ............... 43/42.5, 42.51, 42.52

[56] References Cited
UNITED STATES PATENTS

| | | | |
|---|---|---|---|
| 1,831,267 | 11/1931 | Schwarz | 43/42.51 |
| 2,058,121 | 10/1936 | Allen | 43/42.5 |
| 2,608,787 | 9/1952 | Kroque | 43/42.51 |
| 3,056,228 | 10/1962 | Stackhouse | 43/42.51 |
| 3,418,744 | 12/1968 | Panicci | 43/42.5 |

*Primary Examiner*—Warner H. Camp
*Attorney, Agent, or Firm*—Carver and Company

[57] ABSTRACT

An elongated curved body portion has forward and aft portions with forward and aft openings to accept line and hook connectors respectively. The forward portion has a plane deflector portion inclined to and merging smoothly from a fold extending obliquely across the body portion. The deflector portion has a leading edge parallel to the fold extending from a nose spaced forwardly of the forward opening to a tip aligned with a side edge of the lure body. Motion of the lure is characterized by short period oscillations followed by a series of uncompleted hesitation rolls terminating with a snap roll through 360° and repeating of the action in the opposite direction.

10 Claims, 7 Drawing Figures

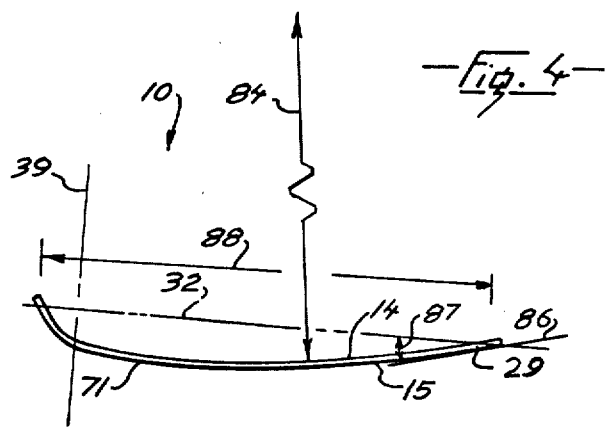
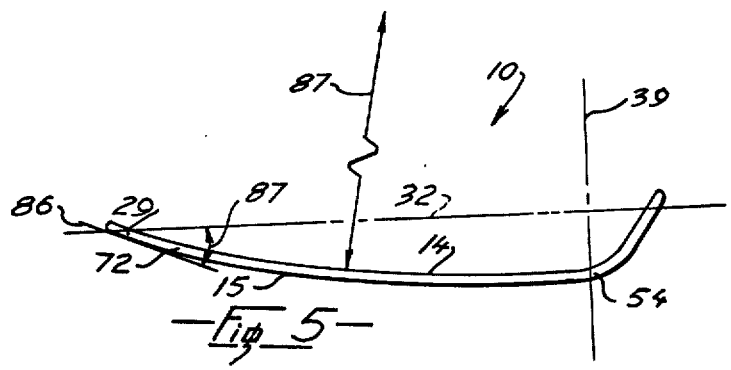
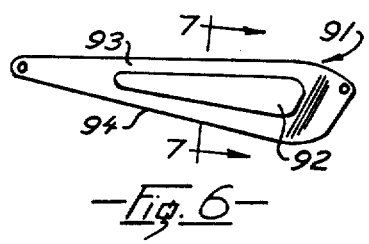
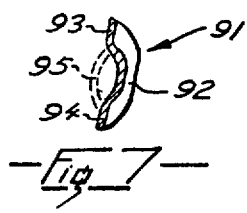

FISHING LURE

BACKGROUND OF THE INVENTION

1. Field of the Invention

The invention relates to a fishing lure for use in trolling, but is also adaptable to other types of fishing.

2. Prior Art

There are many fishing lures available, some being adapted specifically for a particular type of fishing, others claiming to be effective for many different types of fishing. Many known lures describe a regular sequence of motion and it is believed that a fish quickly tires and becomes suspicious of regular motion. The lack of success of many lures is attributed by some fishermen to the regular motion above.

SUMMARY OF THE INVENTION

The invention provides a fishing lure which is simple to use and is of low manufacturing cost but which provides a variety of motion which does not follow an obvious regular pattern but is more erratic and thus more teasing or enticing to fish. Thus in some conditions, the lure of the invention is more effective than some presently available lures.

A fishing lure according to the invention has an elongated curved body portion of stiff thin sheet material. The body portion has a pair of faces defined in part by spaced side edges, and has a maximum width defined by maximum spacing between the side edges. The body portion has a forward end portion having a forward opening to accept a line swivel connector and an aft end portion having an aft opening to accept a hook connector, a longitudinal axis of the lure being defined as a straight line passing through the forward and aft openings. A longitudinal plane of the lure contains the longitudinal axis and is disposed generally normally to the faces of the body portion. The lure has a transverse axis extending across the lure normally to the longitudinal plane adjacent the maximum width position of the lure. The lure has a transverse plane containing the transverse axis and disposed generally normally to adjacent faces of the body portion and intersecting the longitudinal plane at a vertical axis. The forward end portion has a generally plane deflector portion being inclined to and merging smoothly from the aft portion through a fold extending obliquely across the body portion. The deflector portion has an inner edge defined by the fold and a leading edge generally parallel to the inner edge. The fold has a fold axis inclined to the longitudinal axis at a rake angle of between 40° and 80°. The lure has an oblique plane disposed generally normally to the main faces of the body portion and intersecting the longitudinal and transverse planes on the vertical axis. The oblique plane is normal to the fold axis so that, when measured within a plane parallel to the oblique plane, the deflector portion is inclined to the transverse plane at a deflector angle of between 10° and 60°.

The perimeter of the body portion is defined by first and second essentially straight aft side edges converging rearwardly from the maximum width position towards the aft end at essentially equal angles to the longitudinal axis. The forward portion of the body is defined by first and second forward side edges extending forwardly from the maximum width position, the first forward side edge curving forwardly to intersect the longitudinal axis at a nose spaced forwardly of the forward opening. The second forward side edge continues as an essentially straight line coplanar with the second aft side edge and inclined at the deflector angle to a tip at one end of the deflector leading edge. The deflector leading edge defines a portion of the perimeter and extends from the tip to the nose. The curvature and asymmetry of the lure is such that when the lure is used in trolling it describes a motion similar to a wounded or frolicking small fish. The motion is characterized by short period oscillations generally about the vertical axis followed by a series of uncompleted hesitation rolls terminating with a snap roll through 360° about the longitudinal axis, followed by a short period of oscillations and a repeating of the action above in an opposite direction.

A detailed description following, related to drawings describes a preferred embodiment of the invention, which however, is capable of expression in structure other than that particularly described and illustrated.

DESCRIPTION OF THE DRAWINGS

FIG. 4 is a simplified side elevation of the lure as seen from 4—4 of FIG. 2

FIG. 5 is a simplified side elevation of the lure as seen from 5—5 of FIG. 2,

FIG. 6 is a top plan of an alternative lure,

FIG. 7 is a simplified section on 7—7 of FIG. 6.

DETAILED DISCLOSURE

FIG. 1

Figure 1:
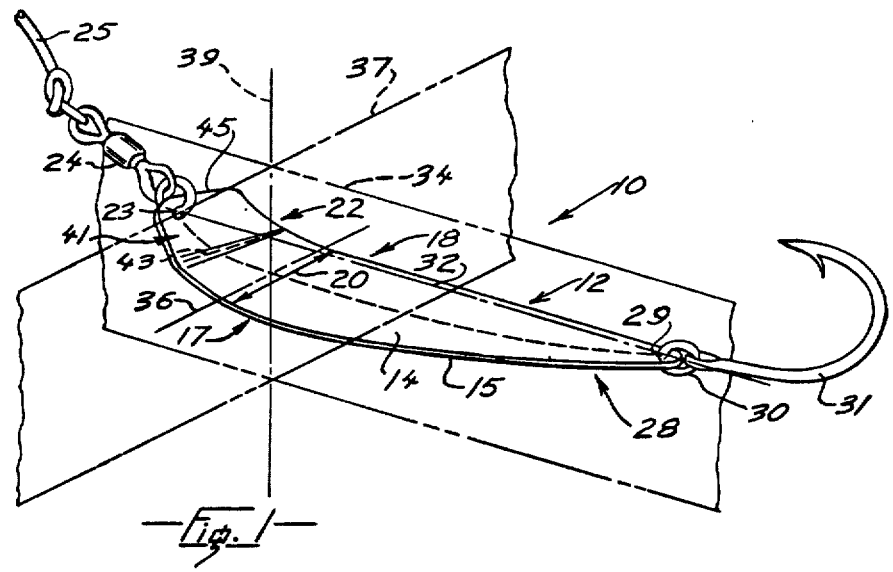
FIG. 1 is a perspective of a lure according to the invention, a hook and line swivel connector being shown, two datum planes being shown diagrammatically.

A fishing lure 10 according to the invention has an elongated curved body portion 12 of stiff thin sheet material. The body portion has first and second faces 14 and 15 having a perimeter defined in part by spaced side edges 17 and 18, the lure having a maximum width 20 defined as maximum spacing between the side edges, measured as shown.

The body portion has a forward portion 22 having a forward opening 23 to accept a line swivel connector 24 secured to a fishing line 25. The body portion has an aft portion 28 having an aft opening 29 accepting a hook connector 30 secured to a hook 31. The lure has a longitudinal axis 32 defined as a straight line passing through centres of the forward and aft openings 23 and 29 respectively. A longitudinal plane shown diagrammatically in broken outline designated 34, contains the longitudinal axis 32 and is disposed generally normally to the faces 14 and 15 of the body portion. The lure has a transverse axis 36 extending across the lure normally to the longitudinal plane at approximately the maximum width position of the lure. A transverse plane, also shown diagrammatically in broken outline designated 37, contains the transverse axis 36 and is disposed normally to the longitudinal plane and generally normally to the faces of the body portion and intersects the longitudinal plane at a vertical axis 39.

The forward end portion has a generally plane deflector portion 41 provided with the forward opening 23 accepting the line swivel connector. The deflector portion is inclined to and merges smoothly from the aft portion through a fold 43 extending obliquely across the body portion, the deflector portion having an inner edge defined by the fold and a leading edge 45 generally parallel to the inner edge.

Figure 2:
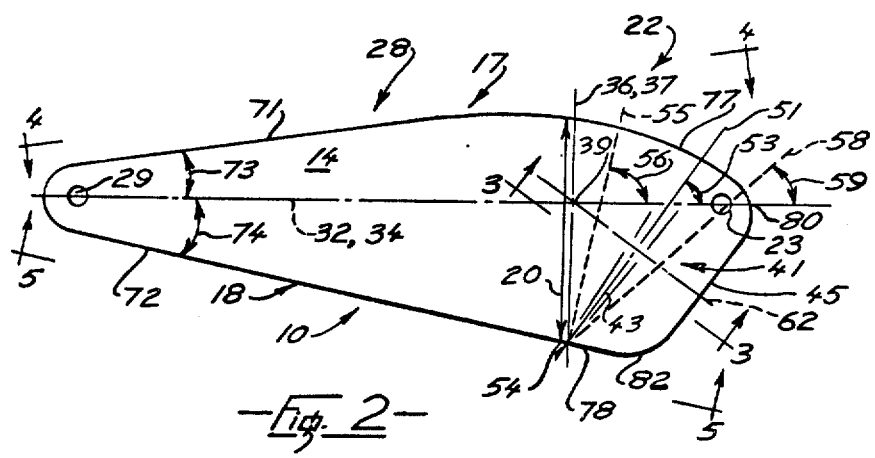
FIG. 2 is a top plan view of the lure of FIG. 1, the hook and swivel connector being removed.
Figure 3:
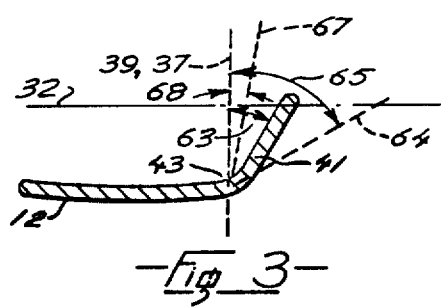
FIG. 3 is a fragmented simplified section on 3—3 of FIG. 2.

FIGS. 2 and 3

As seen in FIG. 2, the fold has a fold axis 51 inclined to the longitudinal axis at a rake angle 53 of about 55°, the fold axis passing through and intersecting the transverse axis 36 at an edge datum 54 on the edge 18. The rake angle 53 has a value within a range of values which are between upper and lower limits defined by swinging the fold axis through an arc centered on the edge datum 54. In an upper limit position 55, the fold axis is inclined at an angle 56 to the longitudinal axis 32, which angle is about 80°. In a lower limit position 58, the fold axis is inclined to the longitudinal axis at an angle 59, which is about 40°. The choice of the rake angle is dependent on the method of fishing and the species of fish to be fished and a typical average is between 50° and 60°.

An oblique plane, shhown in FIG. 2 as an axis 62, is disposed generally normally to the faces of the body portion and intersects the longitudinal and transverse planes on the vertical axis 39. The oblique plane is normal to the fold axis 51 so that, when thhe lure is viewed from within a plane parallel to the deflector plane, for example the line 3—3 of FIG. 2, the deflector portion is inclined to the transverse plane at a deflector angle 63 of about 30° as shown in FIG. 3. The deflector angle has upper and lower limits which are dependent on the method of fishing and the species of fish to be fished, similar to the upper and lower limits of the rake angle. The deflector portion is shown in broken line in an upper limit position 64 inclined at an angle 65, which is abbout 60°. The deflector is also shown in broken line in a lower limit position 67 inclined at an angle 68 which is about 10°. A typical average of deflector angle is between 25° and 35°.

The upper and lower limits specified above for the rake and deflector angles are necessarily approximate due to the complex geometry of the lure. Further, the two angles are considered independently of each other, whereas in practice a change in one angle automatically produces a change in the other relative to the longitudinal axis, and selection of two extremes would not necessarily result in an optimum arrangement for a lure. For example, if an upper limit 56 of the rake angle were combined in a lure with the lower limit 68 of the deflector angle, the lure would have completely different characteristics from an alternative selection of the lower limit 59 of the rake angle combined with the upper limit 65 of the deflector angle.

With reference to FIG. 2, the perimeter of the body portion is defined by first and second essentially straight aft side edges 71 and 72 which converge rearwardly from the maximum width 20 towards the aft end at essentially equal angles 73 and 74 to the longitudinal axis 32. The perimeter is further defined by first and second forward side edges 77 and 78 extending forwardly from the maximum width position 20. The first forward side edge curves forwardly to intersect the longitudinal axis 32 at a nose 80 spaced forwardly of the forward opening 23. The second forward side edgge 78 continues as an essentially straight line generally coplanar with the second aft side edge 72 and inclined at the deflector angle to a tip 82 at one end of the deflector leading edge 45. The deflector leading edge also defines a portion of the perimeter and extends to the nose 80 and merges smoothly into the first forward side edge 77.

FIGS. 4 and 5

Curvature of the lure within the longitudinal plane remote from the deflector portion can be expressed approximately by specifying radii of curvature of the spaced side edges remote from deflector portion. In simplified side elevations as shown in FIGS. 4 and 5, radii of curvature of the aft side edges are shown when the lure is viewed edgewise.

With reference to FIG. 4 the first aft side edge 71, when viewed edgewise, has a radius of curvature 84 of approximately 6 inches. However, the radius of curvature could be between upper and lower limits of 12 inches and 3 inches respectively.

With reference to FIG. 5, the second aft side edge 72 when viewed edgewise has a radius of curvature 85 of about 7 inches, which radius has upper and lower limits of 14 inches and 3 inches respectively. Thus the body portion approximates to a portion of a conical surface, radii of spaced stations on the surface of the cone being approximately as defined above. Clearly, due to the complex geometry and difficulty of defining curvatures by radii of circles, variations of dimensions are permissible to produce a lure within the scope of the invention. A generally cylindrical aft body portion having a radius within the limits above would function similarly, an average radius being between 5 inches and 8 inches.

A tangent 86 to the aft portion of the lure adjacent the aft opening is inclined to the axis 32 at an angle 87. The angle 87 is clearly dependent on the radii of curvature 84 and 85, and length 88 of the lure as measured between the forward and aft openings 22 and 28 respectively. For a length 88 of about 3 inches, radii 84 and 85 of about 6 inches the angle 87 is about 15°. The length 88 has upper and lower limits of about 5 inches and 2 inches and the angle 87 has upper and lower limits of 35° and 5°.

OPERATION

The lure is connected to the fishing line 25 in the normal manner with the swivel connector 24, and the hook 31 is fitted on the aft end hook connector 30. It has been found that with average angles as stated above and at optimum trolling speed of between 2 and 4 knots, the lure produces a particularly effective motion with exceptional performance at catching fish. The motion is similar to that of a wounded or frolicking small fish and is characterized by short period oscillations generally about the vertical axis 39, followed by a series of uncompleted hesitation rolls terminating with a snap roll through 360° about the longitudinal axis 32. This is followed again by the short period oscillations and a repeat of the action above in the opposite direction. Adjustment of the two major angle perimeters, namely the rake and the deflector angle, produces marked differences in the period of the oscillations, and the manner in which the lure oscillates in the uncompleted hesitation rolls. The snap roll is sometimes repeated several times before returning to the short period oscillations.

ALTERNATIVES AND EQUIVALENTS

The lure shown can be easily bent from a piece of suitable sheet metal, suitably about 0.030 inches thick, preferably having a highly polished silvery luster to appear similar to fish scales. If a lighter material is used, or if the lure is to be used in exceptional heavy conditions an alternative stiffened structure as shown in FIGS. 6 and 7 is used.

FIGS. 6 and 7

An alternative lure 91 is preferable for use in heavy conditions and has a dished center portion 92. As seen in FIG. 7, the dished portion 92 extends upwards from generally coplanar border portions 93 and 94, and thus increases stiffness of the lure. The dished portionn can be convex upwards from an upper face, as shown in full outline FIG. 7, or concave downwards as shown in broken outline at 95.

I claim:

1. A fishing lure having an elongated curved body portion of stiff thin sheet material, the body portion having first and second faces having a perimeter defined in part by spaced side edges, the lure having a maximum width defined by maximum spacing between the side edges, the body portion being further characterized by:
   i. a forward portion having a forward opening to accept a line swivel connector,
   ii. an aft portion having an aft opening to accept a hook connector,
   iii. a longitudinal axis defined as a straight line passing through the forward and aft openings,
   iv. a longitudinal plane containing the longitudinal axis and disposed generally normally to the faces of the body portion,
   v. a transverse axis extending across the lure normally to the longitudinal plane adjacent the maximum width position of the lure,
   vi. a transverse plane containing the transverse axis and disposed normally to the longitudinal plane and generally normally to adjacent faces of the body portion, and intersecting the longitudinal plane at a vertical axis,
   vii. the forward end portion having a generally plane deflector portion provided with the forward opening, the deflector portion being inclined to, and merging smoothly from, the aft portion through a fold extending obliquely across the body portion, the deflector portion having an inner edge defined by the fold and a leading edge generally parallel to the inner edge, the fold having a fold axis inclined to the longitudinal axis at a rake angle of between 40° and 80°,
   viii. an oblique plane disposed generally normally to the faces of the body portion and intersecting the longitudinal and transverse planes on the vertical axis, thhe oblique plane being normal to the fold axis so that,, within a plane parallel to the deflector plane, the deflector portion is inclined to the transverse plane at a deflector angle of between 10° and 60°,
   ix. the perimeter of the body portion is defined by first and second essentially straight aft side edges converging rearwardly from the maximum width position toward the aft end at essentially equal angles to the longitudinal axis, and first and second forward side edges extending forwardly from the maximum width position, the first forward side edge curving forwardly to intersect the longitudinal axis at a nose spaced forwardly of the forward opening, the second forward side edge continuing as an essentially straight line coplanar with the second aft side edge and inclined at the deflector angle to a tip at one end of the deflector leading edge, the deflector leading edge defining a portion of the perimeter and extending to the nose, curvature and asymmetry of the lure being such that when the lure is used in trolling it describes a motion similar to that of a wounded or frolicking small fish characterized by short period oscillations generally about the vertical axis, followed by a series of uncompleted hesitation rolls terminating with a snap roll through 360° about the longitudinal axis, followed by short period oscillations and a repeating of the action above in an opposite direction.

2. A fishing lure as claimed in claim 1 in which the deflector angle is between 25° and 35°.

3. A fishing lure as claimed in claim 1 in which the rake angle is between 50° and 60°.

4. A fishing lure as claimed in claim 1 in which the body portion has a dished center portion to increase stiffness of the lure.

5. A fishing lure as claimed in cclaim 1 in which the aft portion has a radius of curvature of between approximately 3 inches and 12 inches, the aft portion being curved upwards on a side of the body similarly to upwards inclination of the deflector portion.

6. A fishing lure as claimed in claim 5 in which the radius of curvature is between 5 inches and 8 inches.

7. A fishing lure as claimed in claim 5 in which:
   i. the deflector angle is between 25° and 35°,
   ii. the rake angle is between 50° and 60°.

8. A fishing lure as claimed in claim 1 in which:
   i. the lure has a length as measured between the forward and aft openings of between 2 inches and 5 inches,
   ii. a tangent at the aft portion of the lure adjacent the aft opening is inclined to the longitudinal axis at an angle of between 5° and 35°.

9. A fishing lure as claimed in claim 8 in which the length is about 3 inches and the tangent is inclined at 15° to the longitudinal axis.

10. A fishing lure as claimed in claim 8 in which:
    i. the deflector angle is between 25° and 35°,
    ii. the rake angle is between 50° and 60°.

* * * * *